Dec. 30, 1947.   N. MARCHAND   2,433,381
PULSE LANDING SYSTEM
Filed Sept. 6, 1943   2 Sheets-Sheet 1
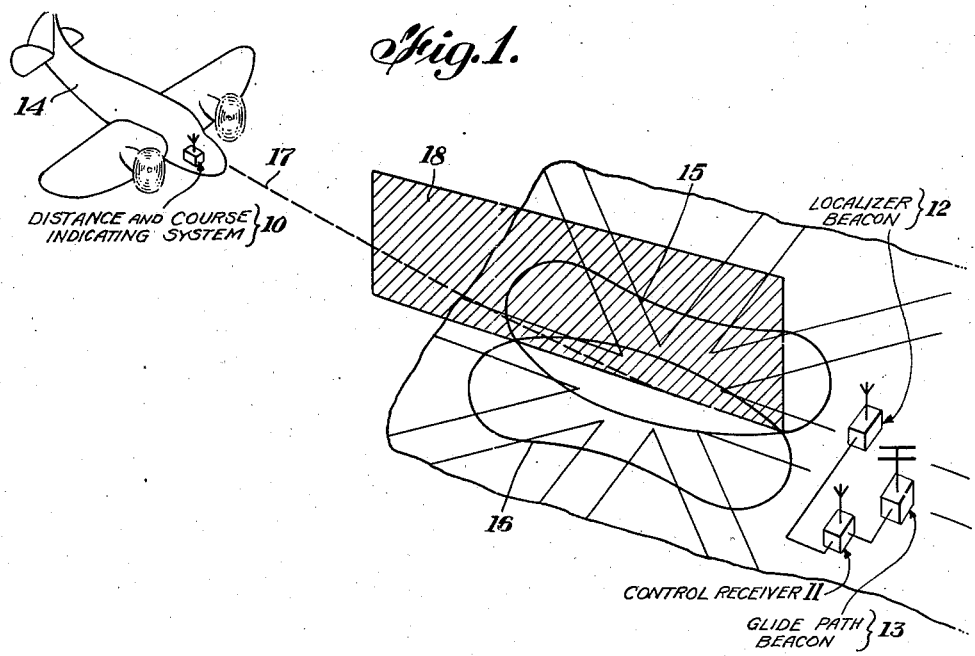
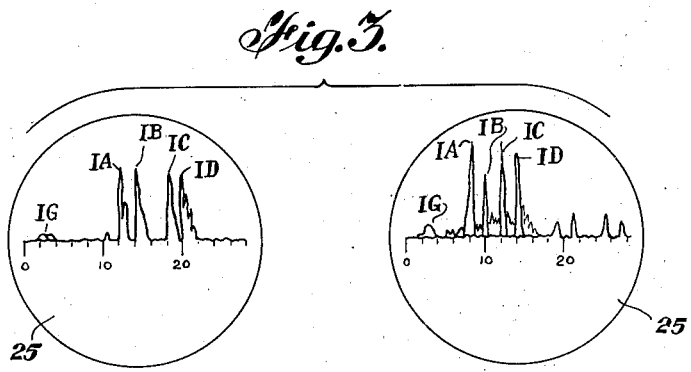
INVENTOR.
NATHAN MARCHAND
BY
ATTORNEY

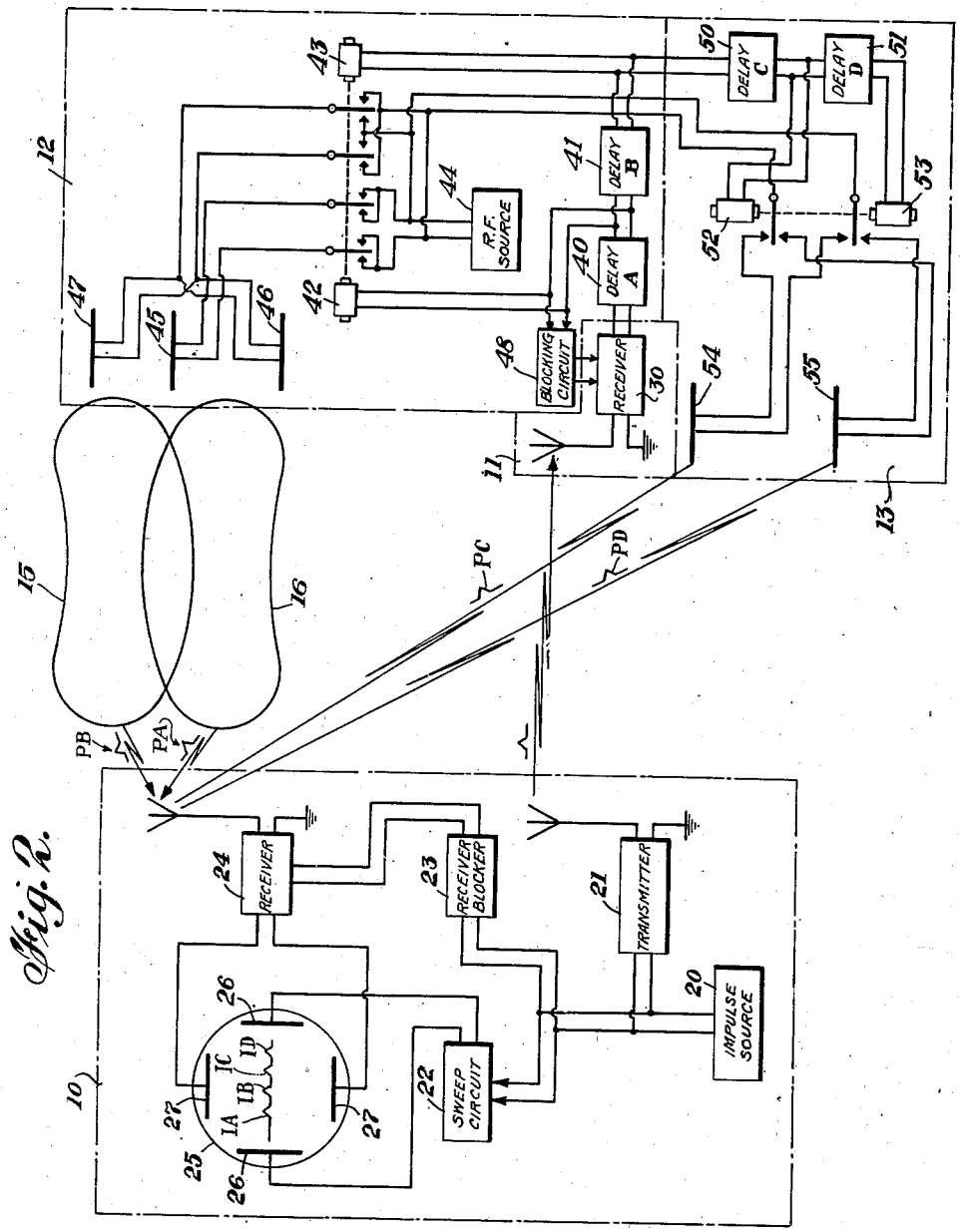

Patented Dec. 30, 1947

2,433,381

UNITED STATES PATENT OFFICE 2,433,381

PULSE LANDING SYSTEM

Nathan Marchand, New York, N. Y., assignor to Federal Telephone and Radio Corporation, East Newark, N. J., a corporation of Delaware Application September 6, 1943, Serial No. 501,342

20 Claims. (Cl. 250—1.52)

This invention relates to radio beacons and more particularly to a method and means for defining a radio beacon course by the use of short pulses of energy.

Many aircraft are now equipped with standard distance determining equipment. This equipment generally transmits a short pulse of energy at periodic intervals which, after reflection, is received on the craft. An indication of the time of traversal of the pulse to and from the reflecting object is produced to show the distance of the craft from this reflecting object. Furthermore, in the art of aircraft navigation, beacons are commonly used to indicate a course line to show the alignment of the runway and to define a glide path for guiding aircraft into the landing on the runway.

It is an object of my invention to provide a circuit utilizing the present distance determining equipment on an aircraft in combination with a pulse controlled beacon transmitter to provide the desired beacon transmissions and corresponding course and distance indications on the craft.

It is a further object of my invention to provide a method and means for producing a beacon indication wherein a short pulse is transmitted from a craft to a receiving station and in response to this received pulse overlapping beacon patterns are transmitted to define the desired course.

It is a still further object of my invention to provide a beacon transmitter arrangement which is triggered by a received pulse to transmit short beacon pulses defining a desired beacon path.

Further objects and features of my invention may be had from the specific description thereof made with reference to the accompanying drawing, in which:

Fig. 1 is a diagrammatic illustration of the apparatus and the beacon patterns produced in accordance with my invention;

Fig. 2 is a circuit diagram of a specific embodiment of my invention; and

Fig. 3 is an illustration of possible patterns produced on the indicator illustrated in Fig. 2.

Turning first to Fig. 1, a distance and course indicating system 10 is shown mounted in an aircraft 14. This distance and course indicating system serves to transmit short pulses to control-receiver 11. Control-receiver 11 then serves to trigger localizer beacon 12 to produce alternately the overlapping field patterns 15 and 16. These patterns are preferably produced only momentarily by a short transmitted pulse so that the pulses may be received on and properly operate the distance and course indicating system 10. By comparison of the pulses from patterns 15 and 16, the pilot may be apprised of his position relative to the localizer course. In addition to localizer beacon 12, received energy also serves to trigger a glide path beacon 13 which serves to produce a glide path line 17 in the vertical plane 18 intersecting the localizer course line. Indication of this glide path is also produced on the craft 14 by the distance course indicating system 10.

Turning now to Fig. 2, a circuit arrangement more clearly defining the apparatus illustrated in Fig. 1 is set forth. The distance and course indicating system 10 may comprise an impulse source 20 which is coupled to transmitter 21 serving to transmit short pulses of energy. Impulse source 20 also serves to time the operation of a sweep circuit 22 which applies a sweep voltage across plates 26 of cathode ray indicator 25. At the same time, the impulses from source 20 may operate receiver blocker 23 which serves to block the receiver 24 during intervals while transmitter 21 is in operation. The output of receiver 24 is applied across vertical deflected plates 27 of cathode ray indicator 25 so that received energy will appear as vertical deflections of the cathode ray beam as it traverses between plates 26.

The transmitted pulses from transmitter 21 are received at 11 and applied to receiver 30 which serves to rectify the pulse to produce a direct current impulse therefrom. This impulse is then delayed successively over delay lines 40 and 41 producing therein delays A, B, respectively. The delayed received pulse, after passing network 40, is applied to a relay 42 and after passing delay network 41 is applied to a relay 43. All this equipment may be considered as arranged at localizer beacon 12. A radio frequency source 44 adapted to be connected over a switch arrangement to the antenna elements 45, 46 and 47 is provided forming with the antennas and switches a known type of radio beacon. Normally, the switch is in a neutral position so that no energy from source 44 is applied to the antenna elements. On application of the delayed pulse to relay 42, however, the switch is operated to energize these antennas transmitting a short pulse PA over pattern 16. This pulse passes quickly and relay 42 is deenergized, returning the switch to normal. A short interval thereafter, dependent upon the delay B, relay 43 is operated, energizing the antennas 45, 46 and 47 in a different phase relation to produce pulse PB serving to produce indicator pattern 15. Energy defining patterns 15 and 16 is successively received on receiver 24 of the craft and applied across the vertical deflector plates 27 producing two indicating pulses IA, IB, as shown. If the craft is on course, the indicating pulses IA, IB are of equal amplitude, as shown in the left hand screen of Fig. 3. If the craft is not on course, however, the impulses IA and IB are of unequal amplitude as shown in the pattern at the right of Fig. 3 and the direction of departure of the course may be determined by the sense of departure from equality of the received pulses. This arrangement by itself may serve at a radio course beacon or may serve as a localizer beacon at an airport.

If the beacon 12 is a localizer beacon, it may be desirable to also provide at the airport a glide path beacon to guide the craft to a landing. The glide path beacon may be energized from the same source 44, as shown in Fig. 2. In this arrangement, glide path beacon 13 includes additional delay lines 50 and 51 producing further delays C and D in the pulse received at 30. This pulse, after delay C is applied to relay 52 and after delay D to a relay 53, and serves alternately to connect source 44 to vertically arranged antennas 54 and 55, respectively. These antennas 54 and 55 may constitute an equi-signal glide path system, the antennas being arranged at different vertical heights such that a radiation lobe from antenna 55 will overlap a null in the radiation pattern of antenna 54. A more complete description of the operation of this type of glide path beacon may be had by reference to copending application of Chester B. Watts, Jr., Serial No. 444,988, filed May 29, 1942, now Patent 2,406,876 granted Sept. 3, 1946. It is clear, however, that any desired type of glide path beacon may be used in place of the specific type shown. Energization of antennas 54 and 55 produces additional transmitted pulses PC and PD which are also received on receiver 24 and applied to vertical deflector plates 27. These pulses produce additional indicator pulses on the screen of cathode ray oscillograph 25, as shown at IC and ID.

Because of additional delay caused by lines 50 and 51, these pulses will be spaced apart a predetermined distance and will also be spaced from indications IA and IB.

In Fig. 3 the pulse indications IC and ID are shown, in the left hand portion thereof, equal in amplitude indicating that the craft is on the glide path course and in the right hand portion are shown to be of unequal amplitude indicating the craft is off the glide path course. It is clear that this inequality likewise shows the direction of departure of the craft above and below the desired glide path line so that the pilot can make the necessary correction.

In addition to indicating the position of the craft relative to the course, it is clear that the received impulse indications will also be spaced along the screen in accordance with the distance of the transmitting beacon from the craft. For this purpose, it is desirable to use the first received impulse IA for distance determination. This distance indication may readily be made by giving to delay network A a fixed delay representing a fixed distance, for example, a two mile distance on the screen. Thus, by subtracting this correction factor from the distance indication made on the indicator, the distance of the craft from the beacon may be readily determined. Furthermore, the transmitted pulses are preferably of considerably greater amplitude than normal reflected pulses so that there is no confusion between the course indicating pulses on the screen and the normal distance indicating pulses received from reflecting objects. Furthermore, the beacon pulses, if reflected from objects in the vicinity of the course will be received at a later time at receiver 24 than the directly transmitted beacon pulses so that the probability of following a false course because of reflections will be substantially eliminated.

In addition, if transmitter 21 and receiver 24 operate on the same frequency, the normal distance determining feature of the apparatus may be used to indicate the altitude of an aircraft above the earth. Thus, the pulse reflected from the earth will be received on receiver 24 and will produce a definite indication as shown at IG, Fig. 3, indicating the altitude of the craft above the earth. Thus, the device may provide an absolute altimeter as well as a beacon indicator without any necessary additional equipment. Under these circumstances, precautions must be taken to prevent receiver 30 from being triggered by transmitted impulses IA, IB, etc. To this end a blocking circuit 48 is provided to block receiver 30 for a sufficient length of time for the pulse to pass all the delay lines 40, 41, 50 and 51. This circuit may be of any desired type, for example, a trigger circuit which is turned into a blocking condition by the pulse applied from the outlet of 40, and which will return to its original position at a fixed time later.

It is clear also that, if desired, source 44 may be of a different radio frequency than that transmitted from transmitter 21 and receiver 24 may be tuned to this frequency in which case the receiver blocking circuit 23 may be eliminated. However, in this case, the altimeter feature of the system will not be present since the pulses reflected from the earth will not be of the proper frequency to be received at 24. It is clear also that other forms of equi-signal beacons may be used in place of the specific type illustrated at 45, 46 and 47, for example, the well known cross coil type may be provided, if desired. Likewise, any type of glide path beacon may be provided although the equi-signal type is preferred rather than constant intensity type.

Delay lines 40, 41, 50 and 51 may be arranged in parallel instead of series, the respective delays then being made progressively greater to afford the desired separation of indications on the screen.

The beacon arrangement in accordance with my invention requires relatively low power equipment since pulses are transmitted only for brief intervals of time. Furthermore, if desired, the beacon transmitter may be turned on only in response to energy received so that the radio frequency is operative only at the time the beacon is desired for guiding a craft.

This type of system is particularly useful for guiding a craft along a narrow, crooked course since then the beacons may be made of relatively low power so as to be ineffective a short distance from the beacon itself. A plurality of such beacons may then be arranged along a course spaced apart a sufficient distance to avoid overlapping of the beacon courses, as defined, and then may be successively triggered into operation by the equipment on the craft as each beacon is approached.

While I have described above the principles of my invention in connection with specific apparatus, and particular modifications thereof, it is to be clearly understood that this description is made only by way of example and not as a limitation on the scope of my invention as set forth in the objects of my invention and the accompanying claims.

What is claimed is:

1. A system for guiding craft along a pre-determined course comprising means on said craft for transmitting a pre-determined signal, transmitter means for transmitting energy in two patterns in overlapping relation on opposite sides of said course, receiver means for receiving said signal, means responsive to said receiver signal for operating said transmitter means to transmit successively a course signal over respective of said two patterns, receiver means on said craft for receiving said transmitted course signal, and means for comparing the received course signal to indicate the position of said craft relative to said course.

2. A system for guiding craft along a predetermined course, comprising means on said craft for transmitting a predetermined short pulse, transmitter means for transmitting energy in two patterns in overlapping relation on opposite sides of said course, receiver means for receiving said pulse, means responsive to said received pulse for operating said transmitter means to transmit successively an energy pulse over respective of said two patterns, craft receiver means on said craft for receiving said transmitted energy pulses, and means for comparing the amplitudes of said received energy pulses to indicate the position of said craft relative to said course.

3. A system according to claim 2, further comprising means for indicating the distance of said craft from said transmitter means in response to the first of said received pulses.

4. A system according to claim 1, wherein said craft is an aircraft, and wherein said craft receiver means is operative to receive said predetermined signal after reflection from the earth, and means for indicating the distance of the craft from the earth in response to said received reflected pulse.

5. A method of guiding a craft along a predetermined course, comprising transmitting from said craft a predetermined signal, receiving said signal at a position spaced along said course at a predetermined location, successively transmitting in response to said received signal, course signals over separate field patterns overlapping along said course line, receiving on said craft said course signals, and comparing the said received course signals to determine the position of said craft relative to said course line.

6. A method according to claim 5, further comprising producing an indication of the distance of said craft from said position in response to the first received of said course signals.

7. A method according to claim 5, further comprising receiving said signal, after reflection from the earth, on said craft and determining the distance of said craft from the earth in response to said received reflected signal.

8. A system for guiding a craft along a pre-determined course comprising transmitter means on said craft for transmitting a pre-determined signal, means for receiving said signal, directive transmitter means arranged along said course line, means controlled by said received signal for providing signals of different characteristics, means for applying signals of one of said characteristics to said directive transmitter, means to produce a first beacon signal transmitted over a pre-determined directive field pattern, means for applying signals of another of said characteristics to said directive transmitter means to produce a second beacon signal transmitted over a pre-determined second field pattern overlapping said first field pattern to define said course, receiver means on said craft for receiving said first and second beacon signals, and means for comparing said first and second received signals to indicate the location of said craft with respect to said course.

9. A system for guiding an aircraft along a predetermined course comprising transmitter means on said craft for transmitting a predetermined signal, means on the ground for receiving said signal, directive transmitter means arranged along said course line, first and second delay means in the output of said receiver means for delaying said received signal for a first and a second time interval, means for applying said received signal after passing said first delay means to said directive transmitter means to produce a first beacon signal transmitted over a predetermined directive field pattern, means for applying said received signal, after passing said second delay means to said directive transmitter to produce a second beacon signal transmitted over a predetermined second directive field pattern overlapping said first field pattern to define said course, receiver means on said craft for receiving said first and second transmitted beacon signals, and means for comparing the said first and second received signals to indicate the location of said craft with respect to said course.

10. A system according to claim 9, wherein said directive transmitter means operates to transmit energy at the same radio frequency as said transmitter means on said craft.

11. A system according to claim 9 wherein said means for applying said received signal after passing said first and second delay means, comprises respective first and second relay means for the differently delayed pulses, and keying means responsive to operation of said relays for providing said first and second directive patterns.

12. A system according to claim 9, in which said transmitter means arranged along said course line is a localizer beacon transmitter, further comprising glide path transmitter means arranged in the vicinity of said localizer beacon and adjusted to define a glide path line along said course line, further delay means for imparting a still different delay to said received signal, and means for applying said still further delayed signal to said glide path transmitter means to define said glide path line.

13. In a system for guiding craft along a pre-determined course wherein a signal transmitter, a signal receiver and means for comparing received signals are provided on said craft, transmitter means for transmitting energy in two patterns in overlapping relation on opposite sides of said course, receiver means for receiving signals from said signal transmitter, means responsive to said received signals for operating said transmitter means and means to transmit successively course signals over respective of said two patterns.

14. In a system for guiding craft along a pre-determined course wherein a signal transmitter, a signal receiver and means for comparing received signals are provided on said craft, means for receiving signals from said signal transmitter, means controlled by said received signals for providing signals of different characteristics, directive transmitter means, means for applying signals of one of said characteristics to said transmitter means to produce a first beacon signal transmitted over a pre-determined directive field pattern, and means for applying signals of another of said characteristics to said transmitter means to produce a second beacon signal transmitted over a pre-determined second directive field pattern overlapping said first field pattern to define said course.

15. In a system for guiding craft along a pre-determined course wherein a signal transmitter, a signal receiver and means for comparing received signals are provided on said craft, means for receiving signals from said signal transmitter, directive transmitter means arranged along said course line, first and second means in the output of said receiver means for delaying said received signal for a first and a second time interval, means for applying said received signal after passing said first delay means to said directive transmitter means to produce a first beacon signal transmitted over a pre-determined directive field pattern, and means for applying said received signal after passing said second delay, means to said directive transmitter to produce a second beacon signal transmitted over a pre-determined signal field pattern overlapping said first field pattern to define said course.

16. A radio beacon responsive to received signals for producing a beacon guiding course comprising means for receiving said signals, directive transmitter means arranged along said course line, first and second delay means in the output of said receiver means for delaying said received signal for a first and a second time interval, means for applying said received signal after passing said first delay means to said directive transmitter means to produce a first beacon signal transmitted over a predetermined directive field pattern, and means for applying said received signal, after said second delay means to said directive transmitter to produce a second beacon pulse transmitted over a predetermined second directive field pattern overlapping said first field pattern to define said course.

17. A radio beacon according to claim 16, wherein said means for applying said received signal after passing said first and second delay means, comprises respective first and second relay means for the differently delayed signals, and keying means responsive to operation of said relays for providing said first and second directive patterns.

18. A radio beacon according to claim 16, in which said transmitter means is a localizer beacon transmitter, further comprising glide path transmitter means arranged in the vicinity of said localizer beacon and adjusted to define a glide path line along said course line, further delay means for imparting a still different delay to said received signals, and means for applying said still further delayed signals to said glide path transmitter means to define said glide path line.

19. A method of guiding an aircraft along a predetermined course, comprising transmitting from said aircraft a predetermined signal, receiving the ground signal thereof, delaying said received signal for a first and a second time interval, producing and transmitting in response to said received signal, after delay of said first time interval, a first beacon signal over a predetermined directive field pattern, producing and transmitting in response to said received signal, after said second delay, a second beacon signal over a predetermined second directive field pattern overlapping said first field pattern to define said course, receiving on said craft said first and second transmitted beacon signals, and comparing the said first and second received signals to indicate the location of said craft with respect to said course.

20. A method according to claim 19, in which said first and second patterns serve as a localizer beacon transmitter for defining a localizer course line, further comprising, imparting a still different delay to said received signal, and producing in response to said still further delayed signal a glide path line in the vertical plane passing through said localizer course line.

NATHAN MARCHAND.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,132,599 | Baumann | Oct. 11, 1938 |
| 2,321,698 | Nolde | June 15, 1943 |